United States Patent
Hugl et al.

(10) Patent No.: US 12,245,237 B2
(45) Date of Patent: Mar. 4, 2025

(54) SEMI-STATIC PATTERN FOR CHANGE OF CELL FOR PHYSICAL UPLINK CONTROL CHANNEL (PUCCH)

(71) Applicant: Nokia Technologies Oy, Espoo (FI)

(72) Inventors: Klaus Hugl, Vienna (AT); Kari Juhani Hooli, Oulu (FI); Juha Sakari Korhonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 425 days.

(21) Appl. No.: 17/555,912

(22) Filed: Dec. 20, 2021

(65) Prior Publication Data
US 2022/0240244 A1    Jul. 28, 2022

Related U.S. Application Data

(60) Provisional application No. 63/141,158, filed on Jan. 25, 2021.

(51) Int. Cl.
*H04W 72/21*      (2023.01)
*H04L 1/1812*     (2023.01)
(Continued)

(52) U.S. Cl.
CPC ........... *H04W 72/21* (2023.01); *H04L 1/1812* (2013.01); *H04L 5/0053* (2013.01); *H04L 27/26025* (2021.01); *H04W 72/0446* (2013.01)

(58) Field of Classification Search
CPC . H04W 72/21; H04W 72/0446; H04W 72/23; H04W 72/231; H04W 72/232;
(Continued)

(56) References Cited

U.S. PATENT DOCUMENTS

| 10,708,935 B2 | 7/2020 | Yang et al. |
| 2015/0195070 A1* | 7/2015 | Kim ............ H04L 5/0048 370/329 |

(Continued)

FOREIGN PATENT DOCUMENTS

| WO | 2014/052375 A1 | 4/2014 |
| WO | 2018/144433 A1 | 8/2018 |
| WO | 2020/145610 A1 | 7/2020 |

OTHER PUBLICATIONS

Extended European Search Report received for corresponding European Patent Application No. 21214842.3, dated Jun. 7, 2022, 8 pages.

(Continued)

*Primary Examiner* — Sun Jong Kim
(74) *Attorney, Agent, or Firm* — SQUIRE PATTON BOGGS (US) LLP (57) ABSTRACT

Systems, methods, apparatuses, and computer program products for semi-static pattern for change of cell for physical uplink control channel (PUCCH) are provided. One method may include configuring at least one user equipment (UE) with a configuration for more than one serving cell for physical uplink control channel (PUCCH) transmission within at least one physical uplink control channel (PUCCH) cell group, and configuring the at least one user equipment (UE) with a configuration for a time-domain pattern of an applicable physical uplink control channel (PUCCH) cell within the at least one physical uplink control channel (PUCCH) cell group.

15 Claims, 5 Drawing Sheets

(51) Int. Cl.
*H04L 5/00* (2006.01)
*H04L 27/26* (2006.01)
*H04W 72/0446* (2023.01)

(58) Field of Classification Search
CPC .............. H04L 1/1812; H04L 5/0053; H04L 27/26025; H04L 5/001; H04L 5/0078; H04L 5/0098
See application file for complete search history.

(56) References Cited

U.S. PATENT DOCUMENTS

| | | | |
|---|---|---|---|
| 2016/0234788 A1 | 8/2016 | Noh et al. | |
| 2017/0237546 A1 | 8/2017 | Yang et al. | |
| 2018/0034526 A1* | 2/2018 | Lee | H04B 7/0647 |
| 2018/0077749 A1* | 3/2018 | Yamada | H04W 72/21 |
| 2019/0082436 A1 | 3/2019 | Huang | |
| 2020/0022175 A1* | 1/2020 | Xiong | H04L 5/001 |
| 2020/0045722 A1* | 2/2020 | Bae | H04W 72/21 |
| 2020/0288457 A1* | 9/2020 | Hong | H04L 1/1812 |
| 2022/0053537 A1* | 2/2022 | Lei | H04L 1/1861 |
| 2022/0104298 A1* | 3/2022 | Ge | H04W 76/15 |
| 2022/0272650 A1* | 8/2022 | Ko | H04W 76/28 |

OTHER PUBLICATIONS

"Other aspects on carrier aggregation", 3GPP TSG RAN WG1 Meeting #92, R1-1801545, Agenda: 7.1.3.4.2, vivo, Feb. 26 Mar. 2, 2018, pp. 1-4.

"3rd Generation Partnership Project; Technical Specification Group Radio Access Network; NR; Physical layer procedures for control (Release 16)", 3GPP TS 38.213, V16.3.0, Sep. 2020, pp. 1-179.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"On UE feedback enhancements for HARQ-ACK", 3GPP TSG RAN WG1 Meeting #103-e, R1-2009063, Agenda: 8.3.1.1, MediaTek Inc, Oct. 26-Nov. 13, 2020, 16 pages.

"Moderator summary on Rel-17 HARQ-ACK feedback enhancements for NR Rel-17 URLLC/IIoT (AI 8.3.1.1)—end of meeting", 3GPP TSG-RAN WG1 Meeting #103-e, R1-2009789, Agenda: 8.3.1.1, Nokia, Oct. 26-Nov. 13, 2020, pp. 1-160.

"HARQ-ACK Enhancements for IIoT/URLLC", 3GPP TSG RAN WG1 Meeting #103-e, R1-2007707, Agenda: 8.3.1.1, Ericsson, Oct. 26- Nov. 13, 2020, 11 pages.

"HARQ-ACK enhancement for IOT and URLLC", 3GPP TSG RAN WG1 Meeting #103-e, R1-2009257, Agenda: 8.3.1.1, Qualcomm Incorporated, Oct. 26-Nov. 13, 2020, pp. 1-11.

"HARQ-ACK feedback enhancement for IIoT/URLLC", 3GPP TSG RAN WG1 Meeting #103-e, R1-2009101, Agenda: 8.3.1.1, Lenovo, Oct. 26-Nov. 13, 2020, pp. 1-3.

Lin et al., "5G New Radio: Unveiling the Essentials of the Next Generation Wireless Access Technology", arXiv, Jun. 18, 2018, pp. 1-8.

European Notice of Allowance issued in corresponding European Patent Application No. 21 214 824.3-1206 on Jun. 21, 2024.

* cited by examiner

SEMI-STATIC PATTERN FOR CHANGE OF CELL FOR PHYSICAL UPLINK CONTROL CHANNEL (PUCCH)

CROSS REFERENCE TO RELATED APPLICATIONS

This application claims priority from U.S. Provisional Application No. 63/141,158, filed on Jan. 25, 2021. The entire contents of this earlier filed application are hereby incorporated by reference in their entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for semi-static pattern for change of cell for physical uplink control channel (PUCCH).

BACKGROUND

Examples of mobile or wireless telecommunication systems may include the Universal Mobile Telecommunications System (UMTS) Terrestrial Radio Access Network (UTRAN), Long Tenn Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein.

SUMMARY

According some aspects, there is provided the subject matter of the independent claims. Some further aspects are defined in the dependent claims. The embodiments that do not fall under the scope of the claims are to be interpreted as examples useful for understanding the disclosure.

In a first aspect thereof the exemplary embodiments of this invention provide a method comprising: receiving, at a user equipment, configuration information for more than one serving cell for physical uplink control channel transmission within at least one physical uplink control channel cell group; receiving configuration information comprising a time-domain pattern of a physical uplink control channel cell within the at least one physical uplink control channel cell group; determining a cell for the physical uplink control channel transmission of an uplink control information transmission based on the configured time-domain pattern; performing uplink control information multiplexing and physical uplink control channel resource determination according to the configuration used on the determined cell for the physical uplink control channel transmission; checking a validity of the determined physical uplink control channel resource on the determined cell for the physical uplink control channel transmission; and transmitting uplink control information on a physical uplink control channel or a physical uplink shared channel when the physical uplink control channel resource is valid.

In a further aspect thereof the exemplary embodiments of this invention provide an apparatus comprising: at least one processor; and at least one memory comprising computer program code, the at least one memory and computer program code configured, with the at least one processor, to cause the apparatus at least to: configure at least one user equipment with more than one serving cell for physical uplink control channel transmission within at least one physical uplink control channel cell group; and configure the at least one user equipment with a time-domain pattern of a physical uplink control channel cell within the at least one physical uplink control channel cell group.

In another aspect thereof the exemplary embodiments of this invention provide an apparatus comprising: at least one processor; and at least one memory comprising computer program code, the at least one memory and computer program code configured, with the at least one processor, to cause the apparatus at least to: receive configuration information for more than one serving cell for physical uplink control channel transmission within at least one physical uplink control channel cell group; receive configuration information comprising a time-domain pattern of a physical uplink control channel cell within the at least one physical uplink control channel cell group; determine a cell for the physical uplink control channel transmission of an uplink control information transmission based on the configured time-domain pattern; perform uplink control information multiplexing and physical uplink control channel resource determination according to the configuration used on the determined cell for the physical uplink control channel transmission; check a validity of the determined physical uplink control channel resource on the determined cell for the physical uplink control channel transmission; and transmit uplink control information on a physical uplink control channel or a physical uplink shared channel when the physical uplink control channel resource is valid.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for semi-static pattern for change of cell for PUCCH, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

An objective of 3GPP Release-17 new radio (NR) relating to industrial IoT (IIoT) and/or URLLC includes UE feedback enhancements for hybrid automatic repeat request (HARQ)-acknowledgment (ACK). Here, one area of interest includes physical uplink control channel (PUCCH) carrier switching for HARQ feedback.

A motivation for considering PUCCH carrier switching for HARQ feedback is the latency issue for time division duplex (TDD) operation. More specifically, when a physical downlink shared channel (PDSCH) is scheduled, the gNB can merely indicate through the k1 value (in number of slots) a slot for PUCCH where the HARQ-ACK of the PDSCH is mapped. In case of TDD operation, this means that the PUCCH carrying HARQ-ACK may need to be delayed in time to guarantee the symbols for PUCCH transmission are actually valid for PUCCH transmission considering the slot format comprising uplink (UL), downlink (DL) and/or flexible symbols.

For URLLC services, low latency is important. Therefore, it had been proposed to enable PUCCH carrier switching for HARQ-ACK feedback which, e.g., for inter-band TDD with different UL/DL configurations can lead to some latency benefits. Two different modes of PUCCH carrier switching have been contemplated: dynamic indication of PUCCH carrier switching (Alternative 1), and PUCCH cell switching based on semi-static configuration/rules (Alternative 2).

The dynamic indication of the PUCCH carrier switching (Alternative 1) would be that, e.g., through some field in the downlink control information (DCI) scheduling the PDSCH the PUCCH carrier switching would be indicated, such as by direct indication of the UL serving cell the PUCCH should be mapped to. The drawback of this method is the issue of missed DCI scheduling PDSCH (which may lead to miss-understanding between gNB and UE about the UL serving cell to be used for PUCCH transmission). Moreover, for semi-persistent scheduling (SPS) PDSCH, this would not be available and would require a separate DCI transmission just to indicate the PUCCH carrier switching leading to increased DL control overhead. As a consequence, PUCCH cell switching based on semi-static configuration/rules (Alternative 2) may become the preferable alternative.

For PUCCH cell switching based on semi-static configuration (Alternative 2), the approach is to determine if the PUCCH can be transmitted on the PUCCH cell (such as Pcell or PUCCH-Scell), and if this would not be possible due to collision with, e.g., DL or synchronization signaling block (SSB) symbols, the UE would select another UL serving cell where the PUCCH transmission would be possible.

Uplink control information (UCI) can comprise HARQ-ACK, scheduling request (SR) or link recovery request (LRR), and channel state information (CSI). SR/LRR and CSI use configured PUCCH resources. In case that UCI comprises HARQ-ACK for dynamically scheduled PDSCH, the PUCCH resource determination can occur in three steps. In a first step, a UE may be configured up to 4 PUCCH resource sets. For each set, a minimum and maximum payload is predetermined or configured. The UE selects the PUCCH resource set based on the number of UCI bits to be transmitted, i.e., the UCI payload size. In a second step, DL assignment contains PUCCH resource indicator (PRI) field, and UE selects the PUCCH resource from the selected PUCCH resource set (in step 1) based on the PRI value. In a third step, in case of PUCCH format 2 or 3, the UE determines the number of resource blocks (RBs) used in the transmission based on the UCI payload and configured maximum code rate. The number of RBs is determined to be smallest number of RBs for which the code rate is below the maximum code rate, capped by the number of RBs configured for the resource.

If PUCCH for different UCIs overlap in time, the UCIs are multiplexed (according to a set of rules regarding e.g. UE processing times) into a single PUCCH transmission. As a result of multiplexing, a new PUCCH resource may be selected for transmission. In Release-16, a priority index is associated to each UCI type, and just the UCI with the same priority index are multiplexed. However, in Release-17, UCI multiplexing of different priority indexes is likely supported.

Certain example embodiments described herein relate to the selection mechanism the UE would use to select a cell for PUCCH transmission in the case of PUCCH cell switching based on semi-static configuration (i.e., Alternative 2). One example embodiment may relate to the semi-static configuration of a cell carrying the PUCCH at certain times (i.e., time domain pattern of cell for PUCCH). The cell for PUCCH may be determined directly according to such pattern, rather than being determined based on specific rules. Some embodiments described herein provide the details of such semi-static configuration and operation of PUCCH cell switching based on the configuration. Example embodiments described in the present disclosure also cover the details on the mechanism for determining PUCCH resource on the UL serving cell applicable for PUCCH.

Certain embodiments may be based on gNB configuration (such as RRC) determining the PUCCH cell given a semi-statically configured timing relation (i.e., time pattern) of the cell carrying PUCCH. An embodiment provides for operation for the time-dependent configuration of a cell which is to carry the PUCCH and the related PUCCH resource selection. Example embodiments consider different options on the RRC configuration of the time-dependent PUCCH cell as well as the operation for cells having different subcarrier spacings (SCS).

It is noted that, according to some embodiments, the cell carrying PUCCH is not semi-statically fixed for the configuration period, but for certain times there may be a time-dependent PUCCH cell configuration allowing to reduce the latency as the possible PUCCH transmission is not limited by the UL/DL configuration of a single cell.

In certain embodiments, there is no need to specify rules on the determination of the cell carrying the PUCCH based on, e.g., interaction with available UL symbols (such as TDD UL/DL configuration, SSB etc.) and cell order etc. However, in an embodiment, the gNB may directly indicate which serving cell is to carry a PUCCH for UCI feedback at a certain time. This will reduce the ambiguity and especially simplify the cell selection and will enable the gNB to keep better control of the potential needed UL resources for PUCCH on different serving cells (i.e., UL resource management/UL scheduler operation). The use of semi-statically configured timing relation allows the network to control the cell for PUCCH, without need to settle for a set of predefined rules.

As will be discussed below, certain embodiments provide a solution for determining an alternative serving cell for PUCCH as well as PUCCH resources for PUCCH transmission. The determination may occur at a UE based on the configuration of a time-dependent (pattern) of cell for PUCCH by the gNB.

In the following, an example operation for a more restricted scenario in terms of configuration (configuration per slot) and cell setup (same SCS for all cells) will be described. Then, additional examples and more detailed operation for cases having an increased time-domain configuration granularity (i.e., down to symbol level), as well as considering cases of cells with different SCS, will be provided.

In an embodiment, a gNB may configure a UE with more than one serving cell for PUCCH transmission within a PUCCH cell group. Alternatively, a gNB may configure a UE with more than one serving cell for PUCCH transmission across more than one PUCCH cell group. For example, the same PUCCH configuration may be applicable for all cells for PUCCH transmission or, alternatively, there may be an independent PUCCH configuration (including PUCCH resource configuration) for each of the applicable PUCCH cells.

According to certain embodiments, the gNB may further configure the UE with a time-dependent pattern of the applicable PUCCH cell. The granularity of the time-domain pattern may be defined in the specification (fixed) or may be configurable to the UE. The granularity of the time-domain pattern may be in multiple of slots (N slots) or symbols (M symbols). In one example, the granularity may be 2 symbols, 7 symbols (for normal CP, 6 symbols for extended CP) or a slot to align with the Release-16 PUCCH configuration of allowing slot or sub-slot based PUCCH configuration. The periodicity of the time-domain pattern may be pre-determined in the specification or may be based on RRC configuration. In one example implementation, the configurable periodicity may have the same candidate values as the TDD UL/DL configuration (e.g., 0.5, 0.625, 1, 1.25, 2, 2.5, 3, 4, 5 and 10 ms).

In certain embodiments, the configuration may contain a reference subcarrier spacing to determine the timing and granularity of the time-domain pattern. According to one option, as with TDD UL/DL configuration, a reference SCS may be a directly configured parameter. According to another option, for cases of mixed SCS of the different applicable UL serving cells, the SCS of a reference cell may determine the timing. According to an embodiment, the reference cell may be implicitly determined or explicitly configured by the gNB. In one embodiment, the implicitly determined reference cell may be the Pcell or PUCCH Scell of the at least one PUCCH cell group. In one embodiment, the implicitly determined reference cell may be the UL serving cell with the lowest (or highest) serving cell index. In another embodiment, the implicitly determined reference cell may be the UL serving cell applicable for PUCCH transmission with the highest SCS. In case of more than one cell with highest SCS, the UL serving cell with the lowest (or highest) serving cell index may be used. The configuration may contain, for each time-domain indication, an index of the cell used for PUCCH transmission. The index of the PUCCH cell may be given by RRC configuration (i.e., specific PUCCH cell index, 0 . . . K) or may be implicitly given by the serving cell index.

For example, for two cells available for PUCCH transmission, a single bit (0 or 1) would indicate the applicable PUCCH cell for the given time instant. The UE may determine the cell for PUCCH transmission of a required UCI transmission based on the RRC configured time-dependent pattern. This may include, that one of the UE's cells within at least one PUCCH cell group serves as a timing reference cell whose slot/sub-slot configuration is used to determine the timing from PDSCH transmission to HARQ-ACK transmission according to the timing parameter in DCI that schedules PDSCH (K1) or activates SPS PDSCH transmission.

In an embodiment, the UE may perform UCI multiplexing and PUCCH resource determination according to configuration used on determined cell for PUCCH transmission. The UE may check and/or determine the validity of PUCCH resource on the determined cell for PUCCH transmission. For example, the UE may determine if the determined PUCCH resource is valid for PUCCH transmission. Here, the validity check may be based on the determined cell for PUCCH (and not the Pcell/PUCCH Scell). For instance, the UL/DL pattern of the determined cell for PUCCH may be used in the validity check. If the PUCCH resource is not valid, the PUCCH (and the related UCI) may be dropped. In certain embodiments, UCI may be transmitted on PUCCH or PUSCH and, if the resulting PUCCH resource is overlapping even partially with a PUSCH in any serving UL cell, the UCI may be mapped on the overlapping PUSCH based on the (Release-15/16) NR multiplexing rules for UCI on PUSCH. Otherwise, the PUCCH may be transmitted on the determined cell for PUCCH transmission.

Figure 1:
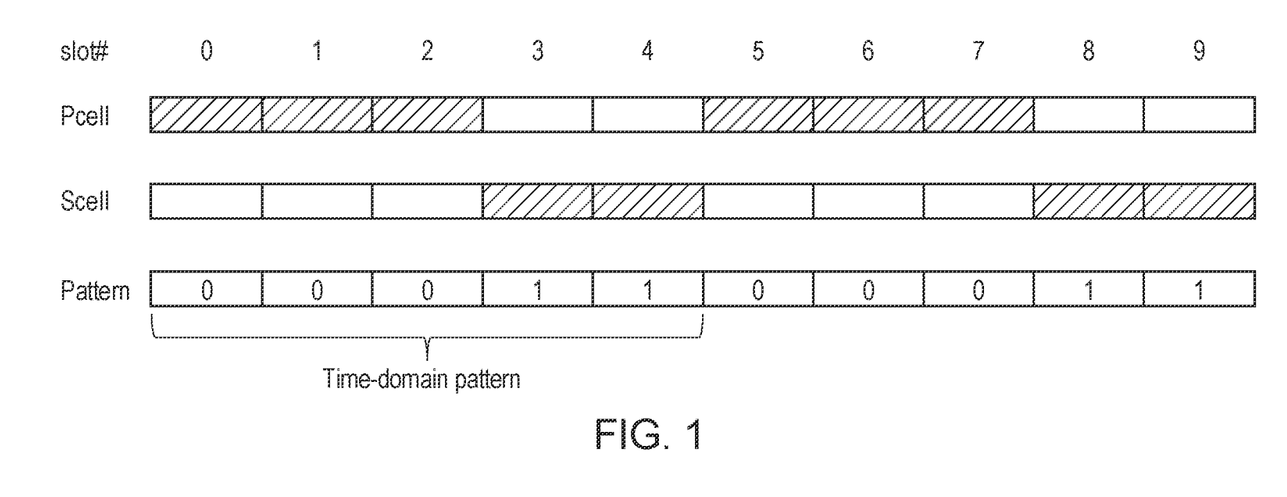
FIG. 1 illustrates an example operation of a cell selection for PUCCH based on semi-static configuration, according to an embodiment.

FIG. 1 illustrates an example of the baseline operation of the cell selection for PUCCH based on semi-static configuration, according to an embodiment. The example shown in FIG. 1 is provided based on the assumption that two cells are applicable for PUCCH transmission (Pcell & Scell)—Pcell is associated with '0' and SCell is associated with a value of '1' in the configured time-domain pattern, that the configured reference SCS as well as the SCS of two cells is 15 kHz SCS (i.e. slot length of 1 ms), and that the time-domain configuration granularity is on slot level and the periodicity of the pattern is 5 ms (i.e., pattern length of 5 slots). For the example, the gNB configured the pattern '00011' for the 5 ms periodicity with slot granularity (i.e. lms granularity for the 15 kHz SCS).

Based on the configured time-domain pattern for the PUCCH cell of '00011', the UE may determine the PUCCH cell given by the pattern. Namely, for slots #{ 0,1,2}+ k*pattern_length, k≥0, the UE may determine the Pcell to be the cell for PUCCH transmission. This is shown as shaded grey for slots 0 to 2 and 5 to 7 in the example of FIG. 1. Based on the pattern with the '1's, the Scell may be configured as the cell for PUCCH transmission, which means that for slots #{3,4}+k*pattern_length, k≥0, the SCell is selected.

One embodiment includes a time-dependent pattern with slot time granularity at reference SCS. The slot timing for UCI transmission (e.g., K1 in case of HARQ-ACK) may be determined based on the reference SCS or reference cell slot timing.

Figure 2:
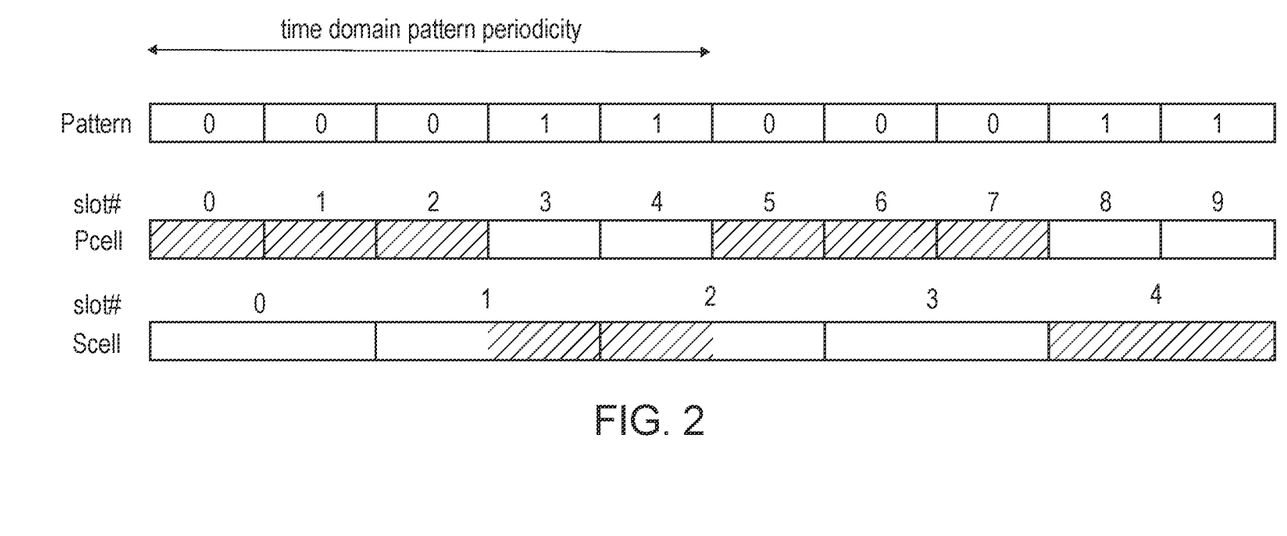
FIG. 2 illustrates an example configuration with a reference subcarrier spacing (SCS) and different SCS of primary cell (PCell) and secondary cell (Scell), according to one embodiment.

FIG. 2 illustrates an example configuration with a reference SCS and different SCS of PCell and Scell, according to one embodiment. More specifically, the example of FIG. 2 illustrates a configuration with a reference SCS that is equal to Pcell SCS but twice the Scell SCS. In the example of FIG. 2, the time domain pattern granularity is equal to Pcell slot (half of Scell slot) and the pattern length is five. To make such a configuration meaningful, the PUCCH resource configuration of the Scell includes resources that are confined to the first and second half of the slot. In an example embodiment, there may be a separate PUCCH configuration for each applicable cell or for each applicable SCS value. In case of HARQ-ACK, the proper PUCCH resource can be selected with the PRI dynamically indicated in the DCI scheduling PDSCH. In case of semi-persistent PUCCH resource allocations (SR, LLR, P-CSI or SP-CSI, HARQ-ACK for SP PDSCH), a UE may be given two resource allocations located on the first and second half of the slot. The UE may select the appropriate resource based on the determined timing. It is noted that this approach can be extended to apply to larger differences between SCell SCS and reference SCS.

Figure 3:
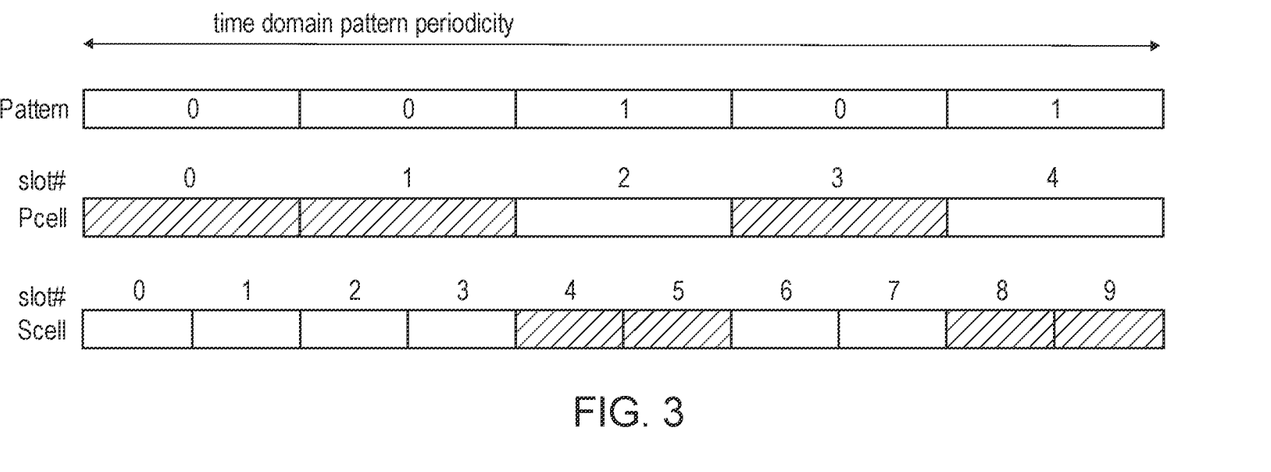
FIG. 3 illustrates another example of a configuration with a reference SCS and different SCS of Pcell and Scell, according to one embodiment.

FIG. 3 illustrates another example of a configuration with a reference SCS and different SCS of Pcell and Scell, according to one embodiment. More specifically, FIG. 3 illustrates a configuration with a reference SCS that is equal to Pcell SCS but half of the Scell SCS. In the example of FIG. 3, the time domain pattern granularity is equal to Pcell slot (two Scell slots) and the pattern length is five. According to an embodiment, when Scell is selected for PUCCH, a rule may be utilized to determine which of the SCell slots is used for PUCCH transmission. For example, one approach may be to determine a reference PUCCH resource (or reference slot/sub-slot) on the reference cell (corresponding to reference SCS, e.g., of PCell), including any UCI multiplexing steps. The last SCell slot overlapping with the determined reference PUCCH resource may be selected for UCI transmission.

Another embodiment may include a time-dependent pattern with time granularity that is shorter than slot at reference SCS (e.g. 7, 2 or 1 symbols). The Scell slot determination mechanisms discussed above for the pattern with slot time granularity can also be applied in this case. However, due to finer time granularity, some further rules may be utilized.

Figure 4:
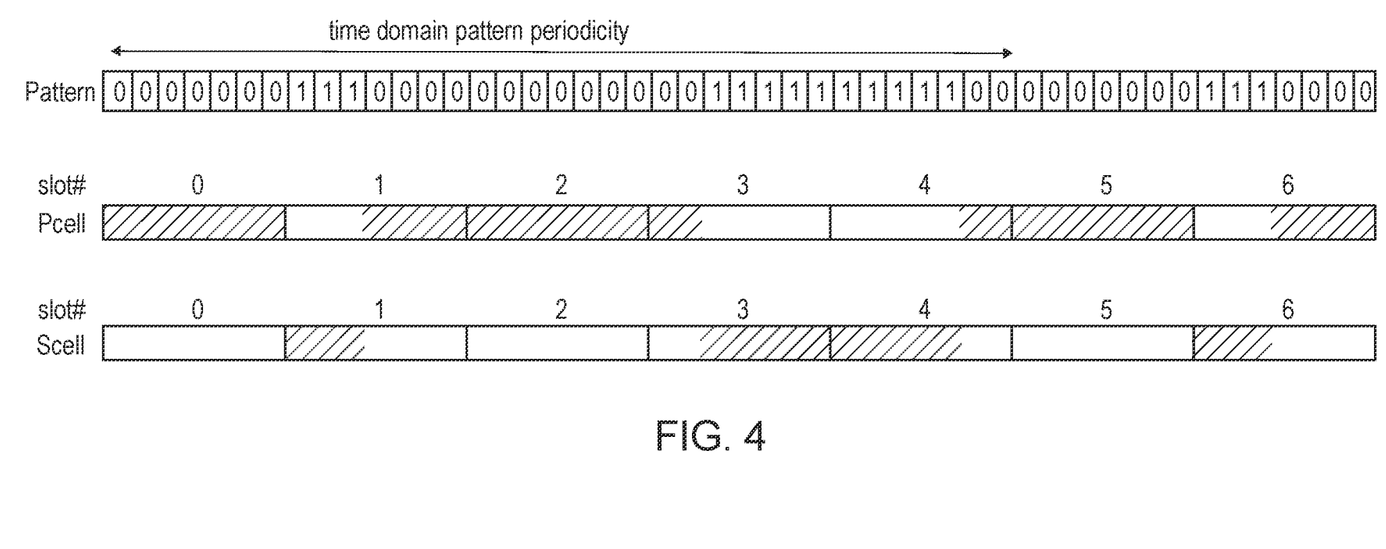
FIG. 4 illustrates an example of a configuration with 2-symbol time granularity used on the time-dependent pattern, according to an embodiment.

According to certain embodiments, the slot timing for UCI transmission (e.g., K1 in case of HARQ-ACK) may be determined based on the reference SCS or reference cell slot timing. Further, to take into account the finer time granularity of the pattern, a reference PUCCH resource on the reference cell (corresponding to reference SCS, e.g., PCell) may be determined (including any UCI multiplexing steps). The symbols of the determined reference PUCCH resource may be used to select right time portion of the pattern for cell selection. FIG. 4 illustrates an example of this configuration with 2-symbol time granularity used on the time-dependent pattern, according to an embodiment. As an example, a PUCCH resource occupying the 2 last symbols for slot #4 would be transmitted on Pcell, while a PUCCH resource occupying the symbols #7 & #8 of slot #4 would be transmitted on Scell.

In some embodiments, a special rule may be provided for a reference PUCCH resource occupying symbols over the PUCCH cell change border. For example, the pattern for a PUCCH resource occupying the 6 last symbols of slot #4 would be {1 1 0 0 0 0} (with the pattern presented at symbol granularity). Some alternatives may include that such a PUCCH is dropped, PUCCH is transmitted on the cell with the highest configured priority or with the lowest (or highest) cell ID among the cells indicated on the overlapping portion of the pattern, or PUCCH is transmitted on the cell applicable for first or last symbol of the reference PUCCH.

In the case that PUCCH resources are configured separately for each applicable cell or SCS value, PUCCH resource determination and possibly UCI multiplexing may be re-performed after the selection of the cell for PUCCH. This may cause change on the symbols that the PUCCH resource occupy and, correspondingly, a conflict with the cell selection pattern. For example, PUCCH resource determined for reference cell may occupy symbols #7 & #8 of slot #4, based on which Scell is selected. There may be also another PUCCH resource on the slot #4, occupying symbols #5 and #6, and, also for this PUCCH, Scell is selected. Scell has its own PUCCH resource configuration, which is applied for the UCI mapped to Scell. As a result, the UCIs are multiplexed on a PUCCH resource occupying symbols #7, #8, #9. The cell selection pattern for these symbols is {1 1 0}. Some alternatives for handling such a situation may include that such PUCCH is dropped, or that a cell is selected only once for a PUCCH after which cell selection pattern is not considered anymore (for that PUCCH transmission). PUCCH is transmitted on the Scell, if possible according to Scell UL/DL pattern. In addition, it may be possible that PUCCH transmission on different cells would overlap in time. To prevent such a case, the latter PUCCH may be dropped according to certain embodiments.

In some embodiments, the cell selection for PUCCH may be restricted (either predefined or configured) for certain UCI priorities or UCI components (HARQ-ACK, CSI, L1-RSRP, SR, LRR). For example, cell selection may be applied just for high priority HARQ-ACK. The other UCI components may be transmitted on the PUCCH cell (according to the UL/DL pattern of the PUCCH cell) if the PUCCH cell is selected based on the time-dependent cell selection pattern or there is no UCI following the time-dependent cell selection pattern transmitted on the same slot.

Figure 5:
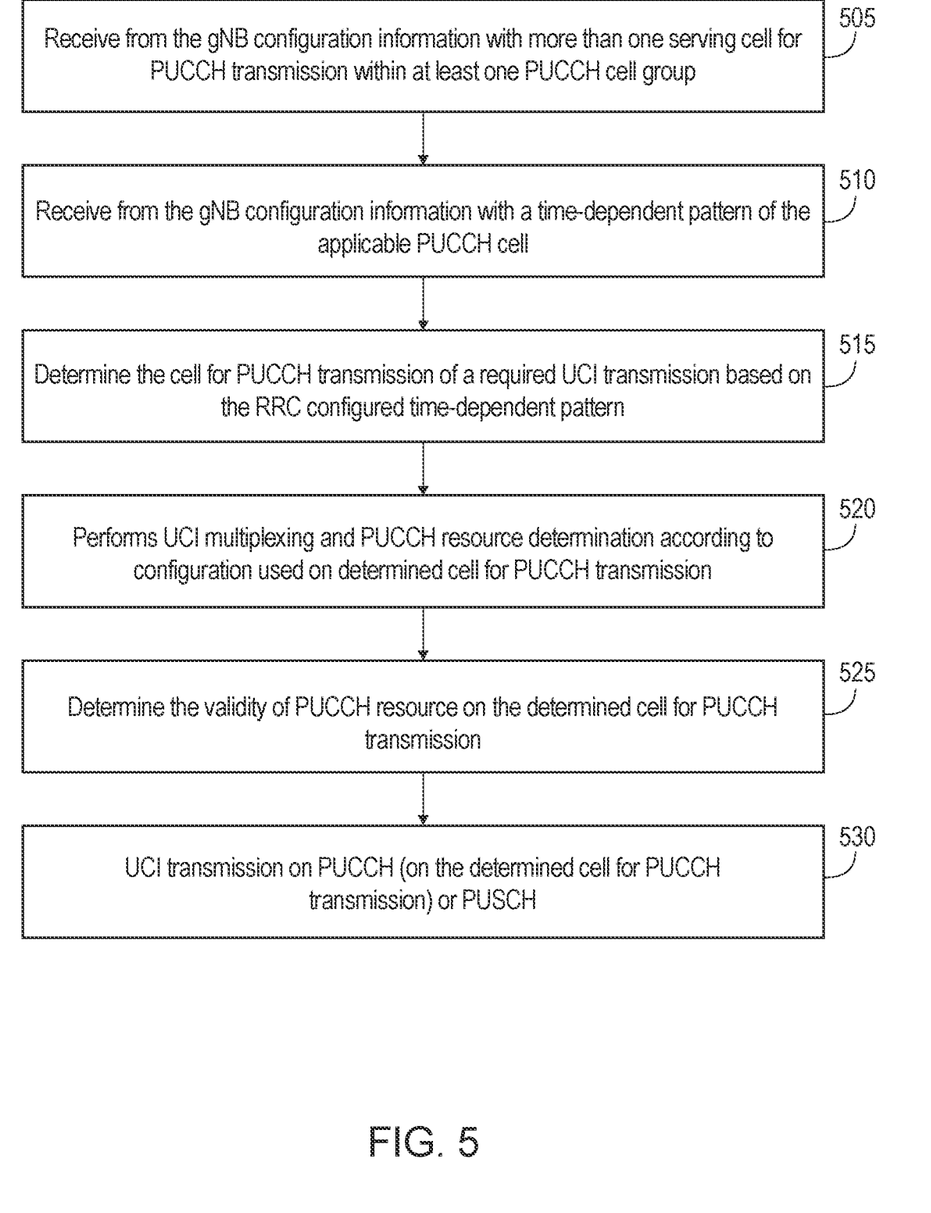
FIG. 5 illustrates an example flow diagram of a method, according to an embodiment.

FIG. 5 illustrates an example flow chart of a method of the cell selection for PUCCH based on semi-static configuration, according to one embodiment. In certain example embodiments, the example flow diagram of FIG. 5 may be performed by a network entity or network node in a communications system, such as LTE or 5G NR. In some example embodiments, the network entity performing one or more of the procedures depicted in FIG. 5 may include or be included in a UE, SL UE, relay UE, mobile station, mobile device, stationary device, a wireless transmit/receive unit, IoT device or sensor, or the like.

As illustrated in the example of FIG. 5, at 505, the method may include receiving, from a gNB, configuration information with more than one serving cell for PUCCH transmission within at least one PUCCH cell group. In addition, the method may include, at 510, receiving, from the gNB, configuration information with a time-dependent pattern of the applicable PUCCH cell. In an embodiment, the method may include, at 515, determining the cell for PUCCH transmission of a required UCI transmission based on the configured time-dependent pattern.

As further illustrated in the example of FIG. 5, the method may include, at 520, performing UCI multiplexing and PUCCH resource determination according to the configuration used on the determined cell for PUCCH transmission. The method may also include, at 525, determining the validity of PUCCH resource on the determined cell for PUCCH transmission. In an embodiment, the method may include, at 530, UCI transmission on PUCCH on the determined cell for PUCCH transmission or on PUSCH.

Figure 6:
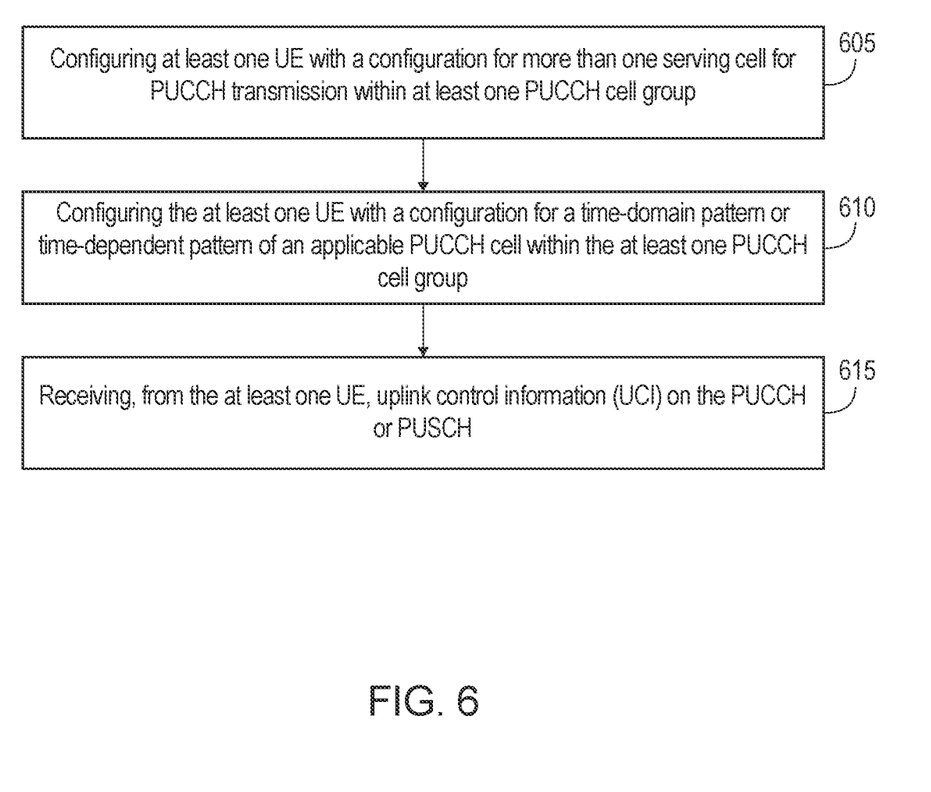
FIG. 6 illustrates an example flow diagram of a method, according to an embodiment.

FIG. 6 illustrates an example flow diagram of a method for semi-static pattern for change of cell for PUCCH, according to one embodiment. In certain example embodiments, the flow diagram of FIG. 6 may be performed by a network entity or network node in a communications system, such as LTE or 5G NR. In some example embodiments, the network entity performing the method of FIG. 6 may include or be included in a base station, access node, node B, eNB, gNB, NG-RAN node, transmission-reception points (TRPs), high altitude platform stations (HAPS), relay station or the like.

As illustrated in the example of FIG. 6, the method may include, at 605, configuring at least one UE with a configuration for more than one serving cell for PUCCH transmission within at least one PUCCH cell group. The method may also include, at 610, configuring the at least one UE with a configuration for a time-domain pattern or time-dependent pattern of an applicable PUCCH cell within the at least one PUCCH cell group. In some embodiments, the same PUCCH configuration may be applicable for all cells for the PUCCH transmission, or an independent PUCCH configuration may be applicable for each of the applicable PUCCH cells.

According to an embodiment, a granularity of the time-domain pattern may be fixed or configurable to the at least one UE. Further, in an embodiment, the granularity of the time-domain pattern may be in multiple of slots or symbols.

In some embodiments, a periodicity of the time-domain pattern may be fixed in the specification or determined based on radio resource configuration (RRC). According to one embodiment, the configuration of the time-domain pattern may include a reference subcarrier spacing (SCS) to determine a timing and granularity of the time-domain pattern. In an embodiment, the reference SCS may be a directly configured parameter. According to some embodiments, for cases of mixed SCS of different applicable UL serving cells, the SCS of a reference cell may determine the timing. In one example, the reference cell may be implicitly determined or explicitly configured by a network node, such as a base station or gNB.

In some embodiments, the implicitly determined reference cell may include a Pcell or PUCCH Scell of at least one PUCCH cell group. According to an embodiment, the implicitly determined reference cell may include an UL serving cell with a lowest (or highest) serving cell index. According to certain embodiments, the implicitly determined reference cell may include an UL serving cell applicable for PUCCH transmission with the highest SCS. In one example, when there is more than one cell having the highest subcarrier spacing (SCS), the uplink (UL) serving cell with a lowest (or highest) serving cell index may be used. According to an embodiment, the configuration of the time-domain pattern may include, for each time-domain indication, an index of the cell used for PUCCH transmission, and the index of the PUCCH cell may be given by RRC configuration or implicitly given by the serving cell index. In certain embodiments, the method of FIG. 6 may also include, at 615, receiving, from the at least one UE, uplink control information (UCI) on the PUCCH or PUSCH.

Figure 7A:
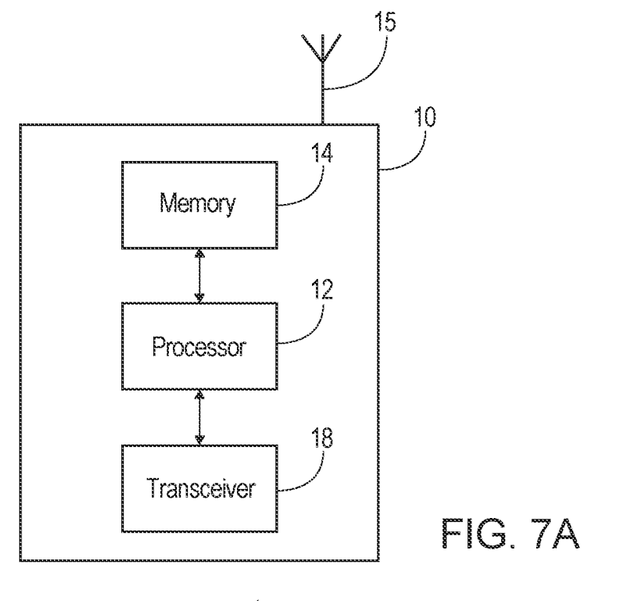
FIG. 7A illustrates an example block diagram of an apparatus, according to an embodiment.

FIG. 7A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7A.

As illustrated in the example of FIG. 7A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 7A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network element or RAN node, such as a base station, access point, Node B, eNB, gNB, TRP, HAPS, IAB node, WLAN access point, or the like. In one example embodiment, apparatus 10 may be a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as that illustrated in FIG. 6 or any other method described herein. In some embodiments, as discussed herein, apparatus 10 may be configured to perform a procedure relating to semi-static pattern for change of cell for PUCCH, for example.

According to an embodiment, apparatus 10 may be controlled by memory 14 and processor 12 to configure at least one UE with a configuration for more than one serving cell for PUCCH transmission within at least one PUCCH cell group. In an embodiment, apparatus 10 may be controlled by memory 14 and processor 12 to configure the at least one UE with a configuration for a time-domain pattern or time-dependent pattern of an applicable PUCCH cell within the at least one PUCCH cell group. In certain embodiments, apparatus 10 may also be controlled by memory 14 and processor 12 to receive, from the at least one UE, uplink control information (UCI) on the PUCCH or PUSCH.

Figure 7B:
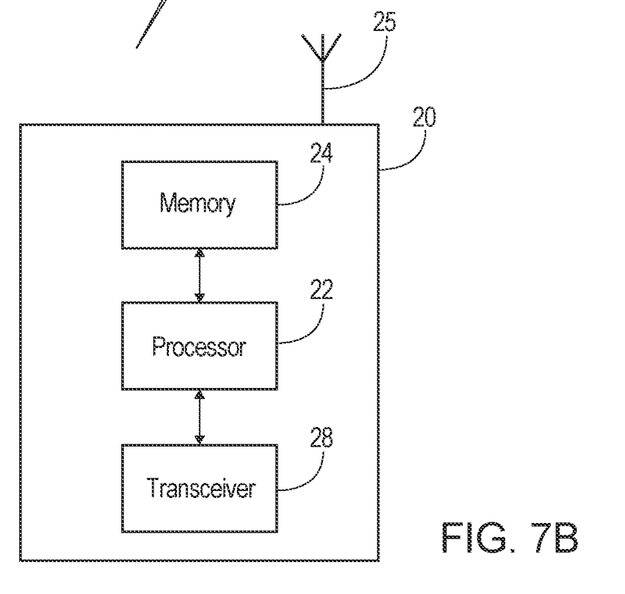
FIG. 7B illustrates an example block diagram of an apparatus, according to an embodiment.

FIG. 7B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7B.

As illustrated in the example of FIG. 7B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIG. 5 or any other method described herein. For example, in an embodiment, apparatus 20 may be controlled to perform a process relating to relating to semi-static pattern for change of cell for PUCCH.

According to certain embodiments, apparatus 20 may be controlled by memory 24 and processor 22 to receive configuration information for more than one serving cell for PUCCH transmission within at least one PUCCH cell group, and to receive configuration information including a time-domain pattern or time-dependent pattern of an applicable physical uplink control channel (PUCCH) cell within the at least one physical uplink control channel (PUCCH) cell group. In an embodiment, apparatus 20 may be controlled by memory 24 and processor 22 to determine the cell for PUCCH transmission of an UCI transmission based on the configured time-domain pattern. According to some embodiments, one of the cells in the PUCCH cell group that serves as a timing reference cell whose slot or sub-slot configuration is used to determine the timing from PDSCH transmission to HARQ-ACK transmission according to a timing parameter in DCI that schedules PDSCH or activates SPS PDSCH transmission.

In some embodiments, apparatus 20 may be controlled by memory 24 and processor 22 to perform UCI multiplexing and PUCCH resource determination according to the configuration used on the determined cell for PUCCH transmission. According to an embodiment, apparatus 20 may be controlled by memory 24 and processor 22 to determine or check the validity of PUCCH resource on the determined cell for PUCCH transmission. In one embodiment, apparatus 20 may be controlled by memory 24 and processor 22 to check the validity by determining if the determined PUCCH resource is valid for PUCCH transmission based at least in part on the determined cell for PUCCH. According to an embodiment, when it is determined that the PUCCH resource is not valid, the PUCCH may be dropped.

According to an embodiment, apparatus 20 may be controlled by memory 24 and processor 22 to transmit UCI on PUCCH or PUSCH. In some embodiments, when the resulting PUCCH resource is overlapping completely or partially with a PUSCH on the same or a different serving UL cell, the transmitting of the UCI may include mapping the UCI on the overlapping PUSCH according to the (Rel-15/Rel-16) NR UCI multiplexing on PUSCH operation. In an embodiment, when the resulting PUCCH resource is not overlapping with the PUSCH on the same or a different serving UL cell, the transmitting of the UCI may include transmitting the UCI on the determined cell for PUCCH transmission.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and management. For example, certain embodiments are applicable for semi-persistent UCI configurations (e.g., CSI, SR, LRR), as well as for HARQ-ACK triggered by SPS PDSCH, and may also be applicable for DCI triggered UCI, such as HARQ-ACK triggered by DCI scheduled PDSCH or aperiodic CSI. Example embodiments do not increase DCI payload either. Furthermore, certain embodiments support time-dependent configuration of a cell carrying PUCCH, allowing for more optimal configuration as well as a possibility to reduce the UCI latency as the possible PUCCH transmission is not limited by the UL/DL configuration of a single cell. In addition, according to certain embodiments, there is no need to specify potentially complex rules on the determination of the cell carrying the PUCCH based on, e.g., interaction with available UL symbols (such as TDD UL/DL configuration, SSB etc.) and cell order etc. This will reduce the ambiguity and especially simplify the cell selection. The network may also adjust the cell selection to better fit with the network's resource management and scheduling strategies, as the cell selection is controlled by gNB via configuration. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

What is claimed is:

1. A method, comprising:
receiving, at a user equipment, configuration information for more than one serving cell for a physical uplink control channel transmission within at least one physical uplink control channel cell group;
receiving configuration information comprising a time-domain pattern of a single physical uplink control channel cell within the at least one physical uplink control channel cell group;
determining a cell for the physical uplink control channel transmission of an uplink control information transmission based on the configured time-domain pattern;
multiplexing uplink control information and determining a physical uplink control channel resource according to the configuration information used on the determined cell for the physical uplink control channel transmission;
checking a validity of the determined physical uplink control channel resource on the determined cell for the physical uplink control channel transmission; and
transmitting the uplink control information on a physical uplink control channel or a physical uplink shared channel when the physical uplink control channel resource is valid,
wherein one of cells within the at least one physical uplink control channel cell group serves as a timing reference cell whose slot or sub-slot configuration is used to determine a timing from physical downlink shared channel transmission to hybrid automatic repeat request-acknowledgment transmission according to a timing parameter in downlink control information that schedules a physical downlink shared channel or activates a semi-persistent scheduling physical downlink shared channel transmission.

2. An apparatus, comprising:
at least one processor; and
at least one memory comprising computer program code that, when is executed by the at least one processor, causes the apparatus at least to:
receive configuration information for more than one serving cell for a physical uplink control channel transmission within at least one physical uplink control channel cell group;
receive configuration information comprising a time-domain pattern to determine a single physical uplink control channel cell within the at least one physical uplink control channel cell group;
determine a cell for the physical uplink control channel transmission of an uplink control information transmission based on the configured time-domain pattern;
multiplex uplink control information and determine a physical uplink control channel resource according to the configuration information used on the determined cell for the physical uplink control channel transmission;
check a validity of the determined physical uplink control channel resource on the determined cell for the physical uplink control channel transmission; and
transmit the uplink control information on a physical uplink control channel or a physical uplink shared channel when the physical uplink control channel resource is valid,
wherein one of cells within the at least one physical uplink control channel cell group serves as a timing reference cell whose slot or sub-slot configuration is used to determine a timing from physical downlink shared channel transmission to hybrid automatic repeat request-acknowledgment transmission according to a timing parameter in downlink control information that schedules a physical downlink shared channel or activates a semi-persistent scheduling physical downlink shared channel transmission.

3. The apparatus of claim 2, wherein the reference cell is implicitly determined or explicitly configured by a network node.

4. The apparatus of claim 3, wherein when the reference cell is implicitly determined, the implicitly determined reference cell comprises a primary cell or a physical uplink control channel secondary cell of the at least one physical uplink control channel cell group.

5. The apparatus of claim 3, wherein when the reference cell is implicitly determined, the implicitly determined reference cell comprises an uplink serving cell with a lowest or highest serving cell index.

6. The apparatus of claim 3, wherein the implicitly determined reference cell comprises an uplink serving cell applicable for the physical uplink control channel transmission with a highest subcarrier spacing, and wherein, when there is more than one cell having the highest subcarrier spacing, the uplink serving cell with a lowest or highest serving cell index is used.

7. The method according to claim 1, wherein the reference cell is implicitly determined or explicitly configured by a network node.

8. The method according to claim 7, wherein when the reference cell is implicitly determined, the implicitly determined reference cell comprises a primary cell or a physical uplink control channel secondary cell of the at least one physical uplink control channel cell group.

9. The method according to claim 7, wherein when the reference cell is implicitly determined, the implicitly determined reference cell comprises an uplink serving cell with a lowest or highest serving cell index.

10. The method according to claim 7, wherein the implicitly determined reference cell comprises an uplink serving cell applicable for the physical uplink control channel transmission with a highest subcarrier spacing, and wherein, when there is more than one cell having the highest subcarrier spacing, the uplink serving cell with a lowest or highest serving cell index is used.

11. A non-transitory computer readable medium encoded with instructions that, when is executed by a processor, perform a process, the process comprising:
receiving configuration information for more than one serving cell for a physical uplink control channel transmission within at least one physical uplink control channel cell group;
receiving configuration information comprising a time-domain pattern to determine a single physical uplink control channel cell within the at least one physical uplink control channel cell group;
determining a cell for the physical uplink control channel transmission of an uplink control information transmission based on the configured time-domain pattern;
multiplexing uplink control information and determining physical uplink control channel resource according to the configuration information used on the determined cell for the physical uplink control channel transmission;
checking a validity of the determined physical uplink control channel resource on the determined cell for the physical uplink control channel transmission; and
transmitting the uplink control information on a physical uplink control channel or a physical uplink shared channel when the physical uplink control channel resource is valid,
wherein one of cells within the at least one physical uplink control channel cell group serves as a timing reference cell whose slot or sub-slot configuration is used to determine a timing from physical downlink shared channel transmission to hybrid automatic repeat request-acknowledgment transmission according to a timing parameter in downlink control information that schedules a physical downlink shared channel or activates a semi-persistent scheduling physical downlink shared channel transmission.

12. The non-transitory computer readable medium according to claim 11, wherein the reference cell is implicitly determined or explicitly configured by a network node.

13. The non-transitory computer readable medium according to claim 12, wherein when the reference cell is implicitly determined, the implicitly determined reference cell comprises a primary cell or a physical uplink control channel secondary cell of the at least one physical uplink control channel cell group.

14. The non-transitory computer readable medium according to claim 12, wherein when the reference cell is implicitly determined, the implicitly determined reference cell comprises an uplink serving cell with a lowest or highest serving cell index.

15. The non-transitory computer readable medium according to claim 12, wherein the implicitly determined reference cell comprises an uplink serving cell applicable for the physical uplink control channel transmission with a highest subcarrier spacing, and wherein, when there is more than one cell having the highest subcarrier spacing, the uplink serving cell with a lowest or highest serving cell index is used.

* * * * *